Ryuichi Yamamoto
and
Kazuhiro Shima
INVENTORS

United States Patent Office 3,398,226
Patented Aug. 20, 1968

3,398,226
COMPLEX OF THIAMINE AND A STYRENE-MALEIC ANHYDRIDE COPOLYMER
Ryuichi Yamamoto, 8-chome, Danjyo-cho, Nishinomiya-shi, Hyogo, Japan, and Kazuhiro Shima, 473 Toboshi, Ibaragi-shi, Osaka, Japan
Continuation-in-part of application Ser. No. 421,394, Dec. 28, 1964. This application Nov. 10, 1966, Ser. 615,869
Claims priority, application Japan, Dec. 28, 1963, 38/71,222
8 Claims. (Cl. 424—78)

ABSTRACT OF THE DISCLOSURE

A complex of a thiamine and a styrene-maleic anhydride copolymer as sole components, the proportion by weight of the thiamine to styrene-maleic anhydride copolymer being in the range of about 20 to 50:80 to 50, the said copolymer being an organic solvent-soluble copolymer of the styrene and maleic anhydride combined with each other in the ratio of maleic anhydride to styrene within the range of 1 to 1–5 and having an average molecular weight not less than about 1000 and not more than about 5000, the said thiamine being a member selected from the group consisting of thiamine, O,S-diacylthiamine, thiamine lower alkyl disulfide, S-lower alkoxycarbonylthiamine and O,S-di(lower)alkoxycarbonylthiamine. Such a thiamine compex is stable, non-incompatible, palatable and shock-proof. It is essentially tasteless and useful for the production of thiamine-containing pharmaceuticals and for enrichment of foods or animal feeds.

---

Figure 1:
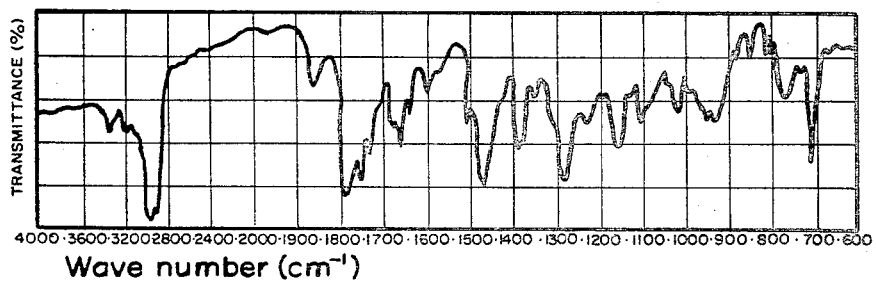

This application is a continuation-in-part of our application, Ser. No. 421,394, filed on Dec. 28, 1964 (abandoned since the filing of the present application).

This invention relates to new thiamine complexes and a method for preparing the same. More particularly, this invention relates to tasteless, stable and therapeutically active thiamine compexes consisting of thiamine and styrene-maleic anhydride copolymer and to its preparation.

In the present specification, the term "thiamine" herein used is intended to mean not only thiamine (or thiol-type thiamine) and its salts but also its esters such as O-acylthiamine, O,S-diacylthiamine, thiamine alkyl disulfide, S-alkoxycarbonylthiamine or O,S-dialkoxycarbonylthiamine, inclusive. Further, the term "part(s)" is intended to represent part(s) by weight.

Recently, thiamine has been widely used as a medicine and a food additive. But thiamine generally has two defects for the above use. Firstly, thiamine is comparatively unstable even in its specific, water-insoluble salts or derivatives and, whenever contacted with heavy metal salts, ascorbic acid and the like, easily decomposes to inactive decomposition products. Secondly, thiamine is bitter in taste to cause unpleasant feeling to patients and other users. To overcome the aforementioned defects of thiamine, an attempt whereby the thiamine particles are coated with a thin film of polymeric resins has been proposed. By such proposal, for instance, microscopic thiamine particles are dispersed in a solution of a polymer such as styrene-maleic anhydride copolymer resin in a suitable solvent, and a solvent which can not dissolve both the thiamine particles and the polymer and is miscible with the said suitable solvent is added thereto whereby a polymer-rich liquid phase is formed surrounding the said thiamine particles. Then, the liquid phase is solidified to form a film on the thiamine particles and the coated particles are recovered from the media. However, this proposed process is practically accompanied by some disadvantages. For instance, the recovery of the solvents from the media is difficultly carried out. Further, for instance, the coated layer on the particles thus obtained is liable to be smashed by grinding or other physical shocks.

It is an object of the present invention to provide special thiamine materials without the general disadvantages set forth above, that is, stable, non-incompatible, palatable and shock-proof thiamine complexes. Another object of the present invention is to provide a stable and tasteless thiamine composition which can be used for production of thiamine-containing medicine and for enrichment of foods or animal feeds. Still further object of this invention is to provide a cost-cut thiamine preparation which can be orally administered per se in the form of powder, granules and tablets or the like. Further objects of the invention will be clear to the skilled in the art from the foregoing and following explanations in this specification.

The thiamine complexes of the present invention are white, fluid, stable and tasteless powderish substances and, further, they do not lose their special characteristics even through any hard mechanical treatment such as grinding, crushing and smashing or the like. Therefore, the said complexes are very useful as thiamine material for medicines, food-stuffs and feed-stuffs.

According to the present invention, the new thiamine complex is prepared by combining free base of thiamine with styrene-maleic anhydride copolymer (hereinafter briefly called SMA-copolymer).

Figure 2:
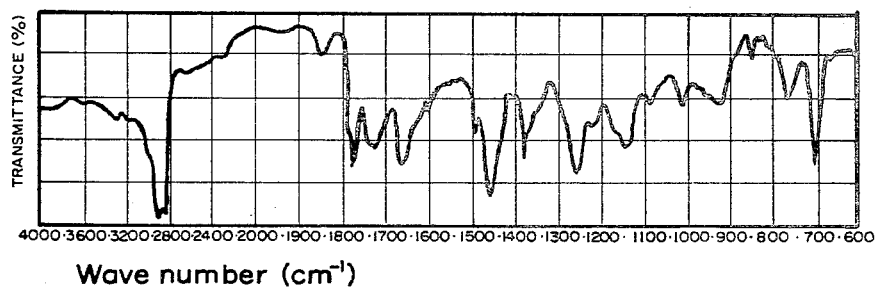

As a result of our study, it has been found that the combination mechanism in the complex is ascribable to the hydrogen bond formed between the amino group at 4-position of the pyrimidine ring of the thiamine and the acid anhydride group of the SMA-copolymer. For example, FIGURE 1 of the accompanying figures of drawing shows the infra-red spectrum and a physical mixture of O,S-diethoxycarbonylthiamine (713 mg.) and SMA-copolymer (283 mg. of SMA resin 3000A, trademark of Sinclair Petrochemicals Inc.), while FIGURE 2 shows a similar infra-red spectrum except that the two components have been preliminarily dissolved in acetone and then the acetone is evaporated off. As shown in the said figures, the two absorption curves are remarkably different, and this difference can only be explained by whether the hydrogen bond is formed or not.

In general, the tasteless thiamine complexes of this invention are prepared by reacting a desired thiamine with SMA-copolymer in non-aqueous solvent. There may be employed any solvent that dissolves both the thiamine and copolymer and is also inert to both, as, for example, acetone, methyl ethyl ketone, chloroform, dichlorethane, dichloromethane, tetrachloroethane, ethyl acetate, isoamyl acetate, and dimethylformamide. It is preferred to use acetone or dichlorethane for O,S-diethoxycarbonylthiamine, thiamine propyl disulfide, S-ethoxycarbonylthiamine, and to use chloroform for S-ethoxycarbonylthiamine, S-butoxycarbonylthiamine, thiamine tetrahydrofurfuryl disulfide, O-benzoylthiamine disulfide or O,S-dibenzoylthiamine. More particularly, the thiamine complexes of this invention are prepared by reacting a desired thiamine (as a free base) with the calculated quantity of SMA-copolymer in non-aqueous solvent, and then evaporating off the solvent from the solution in which they are reacted, by the appropriate method. Several different methods, such as vacuum drying method or spray drying method, can be used to bring about the evaporation of the solvent from the reaction medium. Especially, the latter method is practically useful, since it is economically efficient and, further, by this method, the complex can be sprayed on an adjuvant such as lactose or glucose. The ratio of SMA-copolymer to thiamine which is employed in preparing the products of this invention has been found to be variable within rather wide range. The ratio is not proved exactly, since the product cannot be isolated as a pure crystalline. However, it has been found that the complex can be produced by using 20 to 50% of thiamine and 80 to 50% of SMA-copolymer, and a suitable ratio of elimination of the bitter taste of thiamine may be 45 to 35 parts of thiamine to 55 to 65 parts of SMA-copolymer. Consequently, the excessive thiamine will be retained in the complex if substantially lesser quantities of the copolymer are used, while the excessive copolymer is present in the blended form with the complex if greater quantities of the copolymer are used.

The SMA-copolymer used in this invention should be the copolymer of the styrene and maleic anhydride combined with each other within the range of maleic anhydride:styrene=1:1–5, and having the number average molecular weight of 1000–5000. When the ratio of the styrene to maleic anhydride in the copolymer is less than 1, the copolymer becomes hygroscopic, and when more than 5, the copolymer becomes insoluble in the intestinal juice. In either event, such copolymers become unsuitable for the execution of the invention. And further, if the molecular weight departs from the above range, the resulting complex becomes impractical in view of the hygroscopicity or the solubility to the intestinal juice.

As shown in the following examples, SMA resin 3000A (average molecular weight=1900), which is a trade name of Sinclair Petrochemicals Inc., was used as a typical SMA-copolymer in the present invention. However, it should be fully understood that the principle of the present invention is applicable equally to any other SMA-copolymers as far as they have substantial solubility in any solvent. For example, SMA resin 1000A (average molecular weight=1600) is usable equally to SMA resin 3000A.

The SMA-resins of the 1000A and 3000A series were available on the market and were known generally to those skilled in the art, prior to the present invention. A brochure of the aforementioned Sinclair Petrochemicals Inc., issued Jan. 1, 1964, lists the typical properties of the said resins as follows:

|  | 1000A | 3000A |
|---|---|---|
| Form | Powder | Powder |
| Molecular Weight | 1,600 | 1,900 |
| Melting Range, °C | 150–170 | 115–130 |
| Acid Number | 500 | 275 |
| Specific Viscosity, at 30° C. (10 g./100 ml. acetone) | 0.67 | 0.78 |
| Bulk Density, lb./ft.$^3$ | 35 | 32.2 |
| True Density, lb./ft.$^3$ | 76 | 73.1 |

The exact nature or the composition of the products obtained by the reaction described hereinbefore has not been definitely determined, because the nature of the copolymer which is the starting material and the content of thiamine in the product is not standardized. However, the product thus obtained is, in general, white, amorphous powder which is stable and devoid of bitter taste, that is, powder which gradually melts, blisters and decomposes above the temperature of 90 to 120° C. accompanied by slow softening. Moreover, it has been established that the copolymer employed in the present invention plays a role other than a coating agent on the thiamine particles. This is evidenced by the fact that the product thus obtained will not lose its original nature however fine it may be pulverized. It is favorably utilized as medicines, foodstuffs, and feed-stuffs.

For example, the product (complex) of the present invention can be used per se in the powder form as thiamine active material for medicinal use, with or without adjuvant, or it can be further processed to suitable dosage form such as granules, tablets or the like with or without another ingredient and/or adjuvants through conventional pharmaceutical treatment. In addition, the above product can be added into and/or onto food-stuffs or animal feed for vitamin-enriching purpose. Particularly, referring to the medicinal characteristic thereof, it has been found that it is practically insoluble in water and simulated gastric fluid prescribed in Japanese Pharmacopoeia, 7th edition (JP VII), and soluble in simulated intestinal fluid prescribed ibidem. As a result, the complex alone is capable of use as an enteric thiamine preparation. Furthermore, it is also used as an excellent composite prescription because there are but few medicaments with which it is incompatible.

Th following tables show the results of dissolution test of the complex. In this test, an adequate amount of the sample equivalent to 100 mg. of thiamine hydrochloride was added into 200 ml. of the simulated intestinal fluid prescribed in JP VII and agitated by propeller type stirrer at 100 r.p.m. and at 37° C.

| Sample | Accumulated dissolution percentage of the sample prepared in Examples 1, 3 | | | | | |
|---|---|---|---|---|---|---|
|  | 10 min. | 30 min. | 60 min. | 120 min. | 180 min. | 240 min. |
| Example 1 | 73 | 94 | 100 |  |  |  |
| Example 3 | 85 | 90 | 90 | 95 |  |  |

NOTE.—Particle size of the sample: 50–100 mesh.

| Sample | Accumulated dissolution percentage in accordance with the thiamine content | | | | |
|---|---|---|---|---|---|
|  | 10 min. | 30 min. | 60 min. | 120 min. | 180 min. |
| Thiamine content: |  |  |  |  |  |
| 333 mg./g. | 73 | 94 | 100 |  |  |
| 250 mg./g. | 4.3 | 8.1 | 14 | 42 | 87 |

NOTE.—Particle size of the sample: 50–100 mesh.

| Sample | Accumulated dissolution percentage in accordance with the particle size | | | | | |
|---|---|---|---|---|---|---|
|  | 10 min. | 20 min. | 30 min. | 60 min. | 120 min. | 180 min. |
| Particle size: |  |  |  |  |  |  |
| 20–50 mesh | 1.5 | 1.9 | 1.9 | 5.3 | 26 | 64 |
| 50–100 mesh | 4.3 | 3.8 | 8.1 | 14 | 42 | 87 |
| 100+ mesh | 8.9 | 14 |  | 33 | 73 | 90 |

NOTE.—The samples contain O,S-diethoxycarbonylthiamine corresponding to 250 mg./g. of thiamine hydrochloride.

The following table shows the result of the accelerated aging test of the complex prepared by the reaction of 40 parts of O,S-diethoxycarbonyl thiamine with 60 parts of SMA resin 3000A. The following data are obtained, in this test, after the product stands for 66 days in the constant condition with the temperature maintained at 45° C. and the relative humidity at 75%.

Samples:[1]               Thiamine retention (percent)
A _____ 96.5
B _____ 97.4
C _____ 95.2
D _____ 47.3
E _____ 96.0
F _____ 62.8

[1] Sample A contains 100 mg./g. of the thiamine complex prepared as in Example 3.
Sample C contains 75 mg. of ascorbic acid, 25 mg. of nicotinamide and 5 mg. of calcium pantothenate in addition to 100 mg. of the thiamine complex as in the Sample A.
Sample E contains 100 mg. of the complex as in the Sample A and 75 mg. of ascorbic acid.
Samples B, D and F (controls) contain adequate amount of O,S-diethoxycarbonylthiamine equivalent to the complex in the Samples A, C and E, respectively.

In order to illustrate that the complex has been produced positively, for caution's sake, the inventors show Stability Constant (log K) of complexity between several thiamine derivatives and styrene-maleic anhydride copolymer. The values of log K observed in ethylenedichloride solution with less than 2 mmol/l. contents of thiamine derivative and less than 1% of weight by copolymer are shown in the following table.

| Compound: | Stability constant log K (1./mol)$_{25°\,C.}$ |
|---|---|
| O-benzoylthiamine disulfide | 3.98 |
| thiamine tetrahydrofurfuryl disulfide | 3.64 |
| S-ethoxycarbonylthiamine | 3.46 |
| S-butoxycarbonylthiamine | 3.23 |
| O,S-diethoxycarbonylthiamine | 3.30 |
| O,S-dibenzoylthiamine | 3.26 |

EXAMPLE 1

4.2 parts of O,S-diethoxycarbonylthiamine and 5.8 parts of SMA resin 3000A are dissolved in 7 parts of ethylene dichloride at 80° C. Thereafter, the solvent is completely evaporated under reduced pressure at 55°C. The residue is cooled to room temperature and then pulverized to obtain the complex consisting of O,S-diethoxycarbonylthiamine (equivalent to 333 mg. of thiamine hydrochloride per gram) and SMA-copolymer. The product is quite tasteless, white powder moistening at 90 to 95° C., softening at 120° C. and decomposing at 150° C.

EXAMPLE 2

A complex is prepared according to the method described in Example 1 but using 73.7 parts of SMA resin 3000A, 26.3 parts of S-ethoxycarbonylthiamine and 70 parts of ethylene dischloride. The product contains S-ethoxycarbonylthiamine corresponding to 250 mg. of thiamine hydrochloride per gram.

EXAMPLE 3

With lactose (152 g.), wheat starch (40 g.) and starch paste (8 g.), dry granules (200 g.) are prepared by a conventional method. On the other hand, SMA resin 3000A (58 g.) and O,S-diethoxycarbonylthiamine (42 g.) are dissolved in acetone (150 g.) while heating. The resultant solution is sprayed on the above granules. Thus, the obtained granular preparation contains thiamine-resin complex equivalent to about 100 mg. of thiamine hydrochloride per gram. The product is stable on long storage and is compatible with almost all medicaments.

EXAMPLE 4

2.5 parts of thiamine propyl disulfide and 7.5 parts of SMA resin 3000A are dissolved in 15 parts of ethylene dichloride at 80° C. And then, the solvent is evaporated off at 50° C. The residue is utilized as a tasteless thiamine preparation.

EXAMPLE 5

1.32 g. of S-butoxycarbonylthiamine and 3.58 g. of styrene-maleic anhydride copolymer[1] are dissolved in 7 ml. of chloroform at 50° C. Then the solvent is evaporated off from the solution completely under reduced pressure of 20–30 mm. Hg at 50° C. The obtained residue is pulverized in the uniform size, to obtain the complex comprising S-butoxycarbonylthiamine equivalent to 250 mg. of thiamine hydrochloride per gram. The product is tasteless, white powder moistening at 140° C., melting at 147–152° C.

EXAMPLE 6

1.48 g. of thiamine tetrahydrofurfuryl disulfide and 3.52 g. of SMA-copolymer used in Example 5 are dissolved in 7 ml. of chloroform at 50° C. Then the solvent is evaporated off completely under reduced pressure of 20–30 mm. Hg at 50° C. The residue is pulverized to obtain the complex comprising thiamine tetrahydrofurfuryl disulfide equivalent to 250 mg. of thiamine hydrochloride per gram. The product is tasteless, white powder moistening at 145° C., melting at 151–155° C.

EXAMPLE 7

A complex is prepared according to the method described in Example 5 but using 1.72 g. of O-benzoylthiamine disulfide, 3.28 g. of SMA-copolymer used in Example 5 and 5 ml. of chloroform. The obtained complex contains O-benzoylthiamine disulfide corresponding to 300 mg. of thiamine hydrochloride per gram. The product is white, tasteless powder moistening at 140° C., melting at 143–147° C.

EXAMPLE 8

A complex is prepared according to the method described in Example 5 but using 2.18 g. of O,S-dibenzoylthiamine, 2.82 g. of SMA-copolymer used in Example 5 and 5 ml. of chloroform. The obtained complex contains O,S-dibenzoylthiamine corresponding to 300 mg. of thiamine hydrochloride per gram. The product is tasteless, white powder moistening at about 115° C. and melting at 120–125° C.

EXAMPLE 9

The adequate amount of the complex equivalent to 10 parts of thiamine hydrochloride, prepared by the method described in Example 1 are admixed with 10 parts of riboflavine in a ball mill. The yellowish mixture thus obtained is then slowly poured into a large agitation tank containing 500,000 parts of wheat flour and the contents in the tank are mixed with agitation until a homogeneous mixture is formed. The resulting flour contains O,S-diethoxycarbonylthiamine equivalent to 10 mg. of thiamine hydrochloride and 10 mg. of riboflavine per 500 grams.

We claim:

1. A complex of a thiamine and a styrene-maleic anhydride copolymer as sole components, the proportion by weight of the thiamine to styrene-maleic anhydride copolymer being in the range of about 20 to 50:80 to 50, the said copolymer being an organic solvent-soluble copolymer of the styrene and maleic anhydride combined with each other in the ratio of maleic anhydride to styrene within the range of 1 to 1–5 and having an average molecular weight not less than about 1000 and not more than about 500, the said thiamine being a member selected from the group consisting of thiamine, O,S-diacylthiamine, thiamine lower alkyl disulfide, S-lower alkoxycarbonylthiamine and O,S-di(lower)alkoxycarbonylthiamine.

2. A thiamine complex according to claim 1, wherein the thiamine is O,S-diethoxycarbonylthiamine.

3. A thiamine complex according to claim 1, wherein the thiamine is S-ethoxycarbonylthiamine.

4. A thiamine complex according to claim 1, wherein the thiamine is thiamine propyl disulfide.

5. A thiamine complex according to claim 1, wherein the thiamine is O-benzoylthiamine disulfide.

6. A thiamine complex according to claim 1, wherein the thiamine is O,S-dibenzoylthiamine.

7. A thiamine complex according to claim 1, wherein the thiamine is thiamine tetrahydro furfuryl disulfide.

8. A thiamine complex according to claim 1, wherein the thiamine is S-butoxycarbonylthiamine.

References Cited

Chemical Abstracts, vol. 60, entry 9773d–9774d, 1964, citing Yamamoto et al., Bitamin 25, 472–503(1962).

RICHARD L. HUFF, *Primary Examiner.*

---

[1] The SMA-copolymer is re-produced by this inventor in order to adjust average molecular weight as 2,818, melting range 135–155° C., and copolymer composition as styrene: maleic anhydride=18:7.